United States Patent
Korbel et al.

(10) Patent No.: US 6,731,453 B2
(45) Date of Patent: May 4, 2004

(54) OPTIMIZING THERMAL PERFORMANCE OF AN INTEGRATED CIRCUIT IN A DISC DRIVE

(75) Inventors: Garry E. Korbel, New Prague, MN (US); Brian R. Pollock, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 335 days.

(21) Appl. No.: 09/893,379

(22) Filed: Jun. 27, 2001

(65) Prior Publication Data

US 2002/0109936 A1 Aug. 15, 2002

Related U.S. Application Data

(60) Provisional application No. 60/269,144, filed on Feb. 15, 2001, and provisional application No. 60/271,302, filed on Feb. 23, 2001.

(51) Int. Cl.[7] .............................................. G11B 5/596
(52) U.S. Cl. ..................... 360/78.04; 360/69; 360/75; 360/78.06
(58) Field of Search .......................... 360/78.04, 78.06, 360/69, 75

(56) References Cited

U.S. PATENT DOCUMENTS

| | | | |
|---|---|---|---|
| 3,723,980 A | 3/1973 | Gabor ..................... 340/174.1 |
| 4,799,112 A | 1/1989 | Bremmer et al. ............. 360/31 |
| 4,821,125 A | 4/1989 | Christensen et al. .......... 360/31 |
| 4,907,109 A | 3/1990 | Senio ..................... 360/78.04 |
| 4,965,501 A | 10/1990 | Hashimoto ................. 318/595 |
| 5,047,876 A | 9/1991 | Genheimer et al. ........... 360/46 |
| 5,084,791 A | 1/1992 | Thanos et al. ........... 360/77.04 |
| 5,128,813 A | 7/1992 | Lee ........................ 360/78.07 |
| 5,262,907 A | 11/1993 | Duffy et al. ............ 360/77.05 |
| 5,276,662 A | 1/1994 | Shaver, Jr. et al. .......... 369/32 |
| 5,408,365 A | 4/1995 | Van Doorn et al. ........... 360/46 |
| 5,408,367 A | 4/1995 | Emo ......................... 360/53 |
| 5,422,760 A | 6/1995 | Abbott et al. ............... 360/46 |
| 5,455,717 A | 10/1995 | Van Doorn et al. ............ 360/6 |
| 5,550,502 A | 8/1996 | Aranovsky ................. 327/423 |
| 5,592,340 A | 1/1997 | Minuhin et al. ............. 360/46 |
| 5,631,999 A | 5/1997 | Dinsmore .................. 388/805 |
| 5,726,818 A | 3/1998 | Reed et al. ................. 360/51 |
| 5,732,055 A | 3/1998 | Masaki et al. ............... 369/54 |
| 5,844,743 A * | 12/1998 | Funches .................. 360/78.04 |
| 6,122,131 A * | 9/2000 | Jeppson ................... 360/77.02 |
| 6,124,998 A | 9/2000 | Kanegae ..................... 360/68 |
| 6,266,203 B1 * | 7/2001 | Street et al. ................ 360/69 |
| 6,496,319 B1 * | 12/2002 | Kusumoto et al. ............ 360/75 |
| 2001/0030825 A1 * | 10/2001 | Ukani et al. ................ 360/69 |
| 2003/0002196 A1 * | 1/2003 | Kusumoto et al. ............ 360/75 |

* cited by examiner

*Primary Examiner*—David Hudspeth
*Assistant Examiner*—Mitchell Slavitt
(74) *Attorney, Agent, or Firm*—Westman, Champlin & Kelly

(57) ABSTRACT

A disc drive comprises a drive motor mechanically coupled to a disc and a voice coil motor mechanically coupled to a read/write head on the disc. A power integrated circuit is electrically coupled to the drive motor and the voice coil motor. The power integrated circuit includes an integrated temperature sensor that provides a temperature output. A control circuit receives the temperature output and provides a voice coil motor control output to the power integrated circuit as a function of the temperature output.

19 Claims, 5 Drawing Sheets

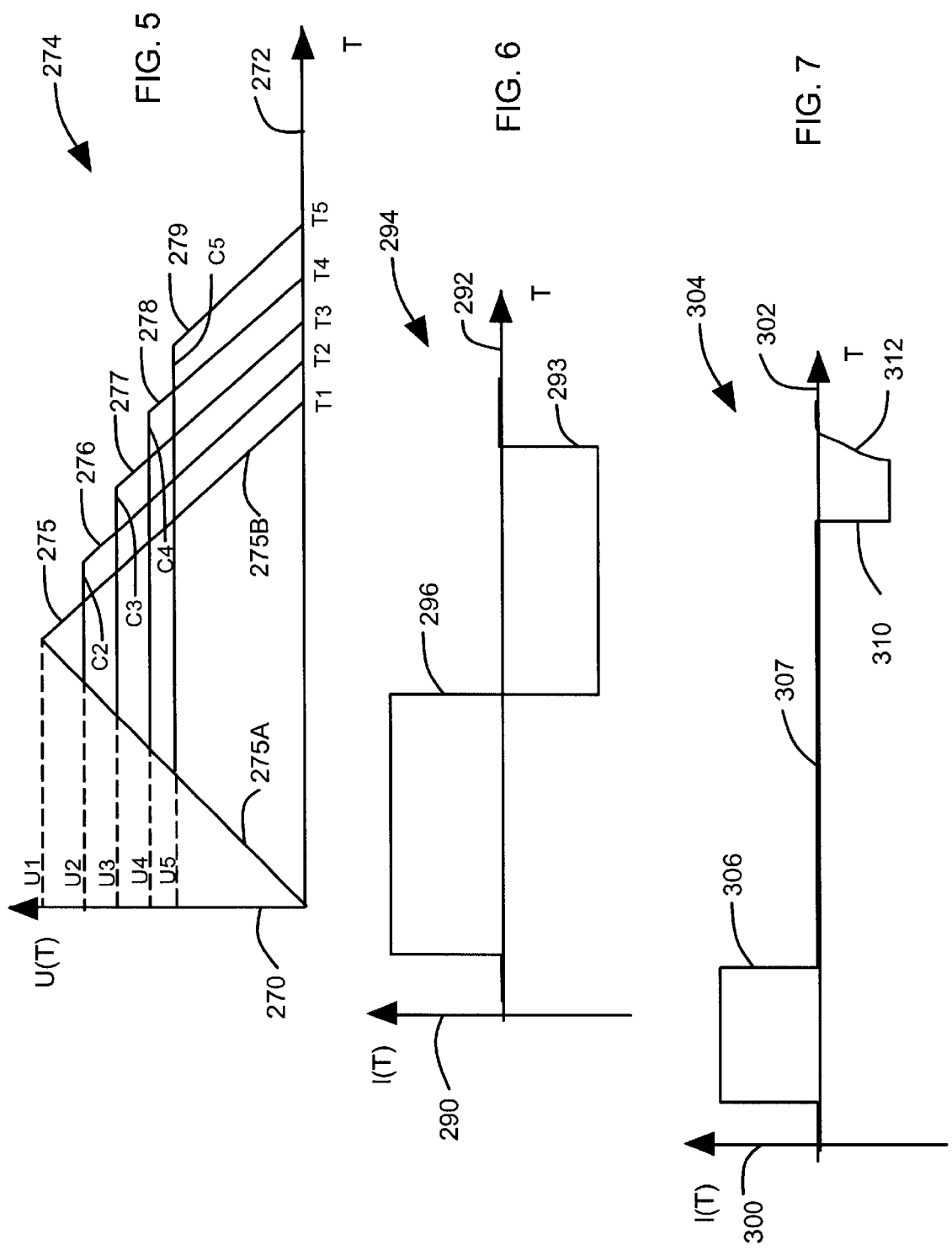

OPTIMIZING THERMAL PERFORMANCE OF AN INTEGRATED CIRCUIT IN A DISC DRIVE

CROSS-REFERENCE TO RELATED APPLICATIONS

This application claims priority benefits from U.S. Provisional Application 60/269,144 titled "Method of Optimizing Thermal Performance of An Integrated Amplifier in a Disc Drive," filed Feb. 15, 2001; this application also claims priority from Provisional Application Serial No. 60/271,302 titled "Method of limiting Temperature Rise in a Disc Drive Integrated Amplifier," filed on Feb. 23, 2001; and reference is also made to related co-pending U.S. patent application Ser. No. 09/893,130 entitled "IMPROVING THERMAL PERFORMANCE OF AN INTEGRATED AMPLIFIER IN A DISC DRIVE," filed on Jun. 27, 2001.

FIELD OF THE INVENTION

The present invention relates generally to disc drive data storage devices. In particular the present invention relates without limitation to thermal performance of a power integrated circuit in a disc drive.

BACKGROUND OF THE INVENTION

In disc drives, relatively large currents are provided to a drive motor that spins a disc pack, to a voice coil motor that positions a read/write head and to power supply busses in the disc drive. Each of these currents is typically regulated, at least in part, by using discrete power semiconductor devices in the disc drive.

These discrete power semiconductor devices collectively dissipate a large amount of heat in relation to the size and surface area of the disc drive housing. There are substantial temperature rises in disc drives, however the temperature rise in each power semiconductor device is different and difficult to predict because the power dissipated varies depending on the mounting and usage of the disc drive.

There is a desire to monitor the heat rise in approximate ten different power semiconductor devices in a disc drive, so that disc access speed can be curtailed when any one of the power semiconductor devices approaches its maximum reliable operating temperature. The number of temperature sensors needed to do this monitoring, however, is cost prohibitive.

There is a need to provide monitoring of multiple power semiconductor devices in a disc drive that is both economical and that monitors a large number of power semiconductor devices. Embodiments of the present invention address one of more of these and other problems, and offer advantages over the prior art.

SUMMARY OF THE INVENTION

In the illustrated embodiments, a disc drive comprises a drive motor mechanically coupled to a disc and a voice coil motor mechanically coupled to a read/write head on the disc. A power integrated circuit is electrically coupled to the drive motor and the voice coil motor. The power integrated circuit includes an integrated temperature sensor providing a temperature output representing a temperature of the power integrated circuit. A control circuit receives the temperature output and provides a voice coil motor control output to the power integrated circuit as a function of the temperature output.

In preferred embodiments, the temperature output is a continuous representation of the temperature and the voice coil motor control output has an access speed that is adjusted after completion of a current read/write cycle depending on the temperature.

These and various other features as well as advantages that characterize the present invention will be apparent upon reading of the following detailed description and review of the associated drawings.

BRIEF DESCRIPTION OF THE DRAWINGS

FIG. 5 illustrates head velocity U(T) as a function of time for various acceleration, coast and deceleration combinations.

FIGS. 6–7 illustrate voice coil motor (VCM) currents I(T) as a function of time.

DETAILED DESCRIPTION OF ILLUSTRATIVE EMBODIMENTS

Power amplifiers used in disk drives to energize a voice coil and a spindle motor historically used discrete power transistors. It is now possible to integrate these power transistors along with an integrated circuit that formerly controlled the external power transistors into a single integrated circuit package. When all the power transistors, which typically consisted of 10 individual transistors, are concentrated inside one integrated circuit package, the power density of the integrated solution is higher than that found in the former discrete amplifier solution.

When the total power that was previously distributed across ten or more devices is concentrated into one physical component, the integrated circuit's junction temperature becomes an issue. This is a particular problem in high performance products.

All semiconductors have a maximum reliable operating temperature. Operating the device at or above the reliable operating temperature can result in several undesirable behaviors such as: degraded performance, increased power losses, and catastrophic failure.

Previous attempts to deal with the high power density of a totally integrated amplifier utilized a separate temperature switch to indicate when a device maximum junction temperature has been reached. Upon this high temperature trigger event, the disk drive would either disable an actuator voice coil amplifier or even turn off the disk drive. In either case the disk drive would no longer be available to save or recall data.

In the embodiments illustrated below, a temperature sensor is integrated into a power integrated circuit. The temperature sensor has close thermal coupling to power semiconductor devices integrated into the power integrated circuit. The temperature sensor provides a continuous representation of the power integrated circuit's temperature. A control circuit adjusts the access speed the voice coil as needed to keep the temperature of the power integrated circuit below the maximum reliable operating temperature.

Figure 1:
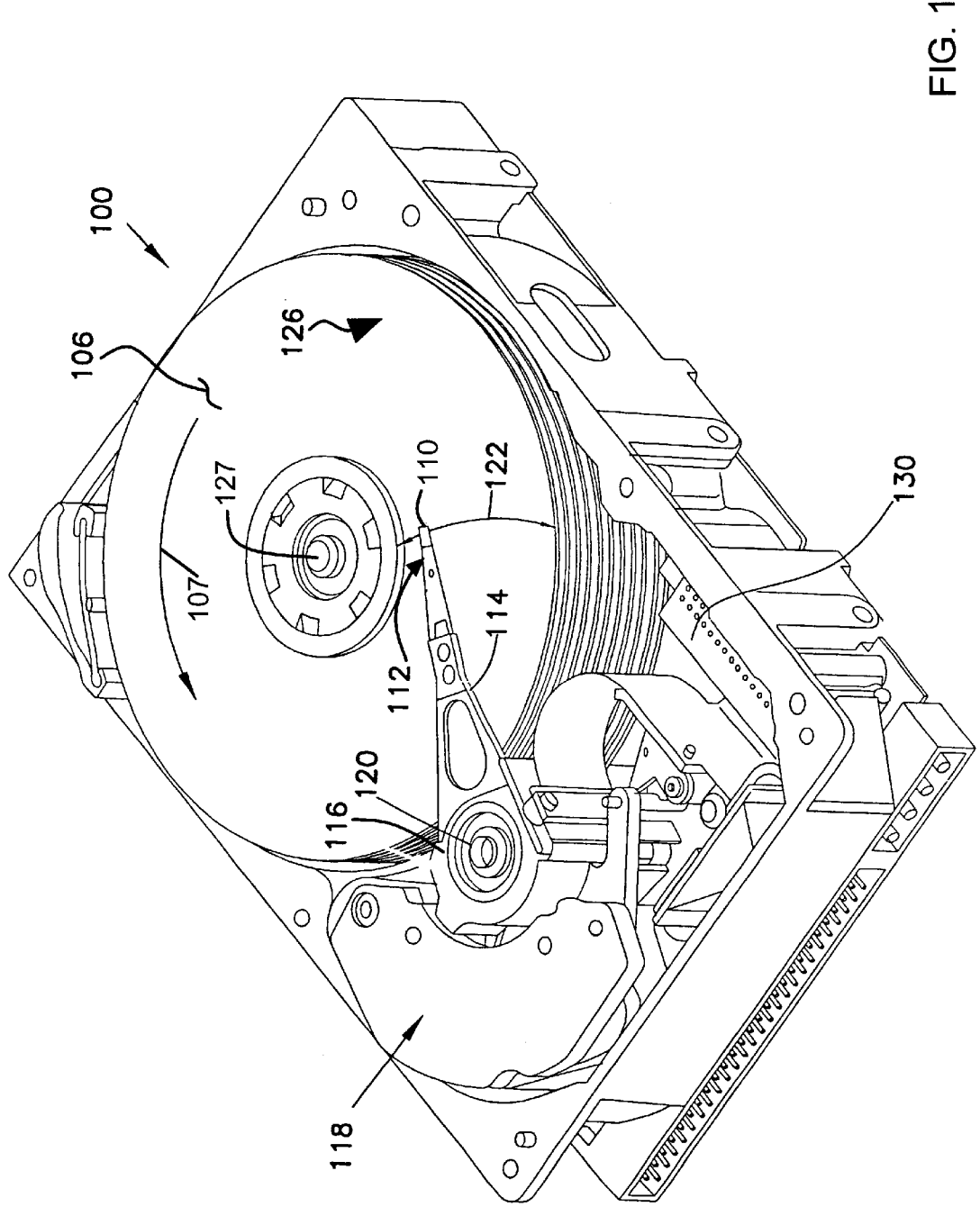
FIG. 1 illustrates a disc drive data storage device.

FIG. 1 illustrates an embodiment of a disc drive storage device 100. Disc drive 100 includes a disc pack 126 having storage surfaces 106 that are illustratively layers of material (such as magnetic material or optically readable material). The disc pack 126 includes a stack of multiple discs each accessible by a read/write assembly 112 that includes a transducer or head 110. A spindle motor 127 drives rotation of the discs in disc pack 126 in a direction such as that shown by arrow 107. As discs are rotated, read/write assembly 112 accesses different rotational locations on the storage surfaces 106 in disc pack 126. Read/write assembly 112 is actuated for radial movement relative to the disc surfaces 106, such as in a direction indicated by arrow 122, in order to access different tracks (or radial positions) on the disc surfaces 106. Such actuation of read/write assembly 112 is illustratively provided by a servo system which includes a voice coil motor (VCM) 118. Voice coil motor 118 includes a rotor 116 that pivots on axis 120. VCM 118 also illustratively includes an arm 114 that supports the read/write head assembly 112.

Disc drive 100 illustratively includes control circuitry 130 for controlling operation of disc drive 100 and for transferring data in and out of the disc drive 100. In doing so, control circuitry 130 illustratively includes power switches (such as power transistors) that provide energization to spindle motor 127 and voice coil motor 118.

In controlling disc drive 100, control circuitry 130 illustratively energizes spindle motor 127 so that the disc pack 126 rotates and can thus be accessed by read/write assembly 112. Control circuitry 130 also controls voice coil motor 118 to perform either track following or track seek operations. In a track following operation, the voice coil motor 118 controls the radial position of read/write assembly 112 to maintain assembly 112 over a designated track on the disc surface. In order to perform a seek operation, control circuitry 130 illustratively controls voice coil motor 118 so that it moves radially in the direction indicated by arrow 122 to a desired track or cylinder on the disc surfaces 106. In order to do this, control circuit 130 illustratively controls voice coil motor 118 according to a seek profile.

Figure 2:
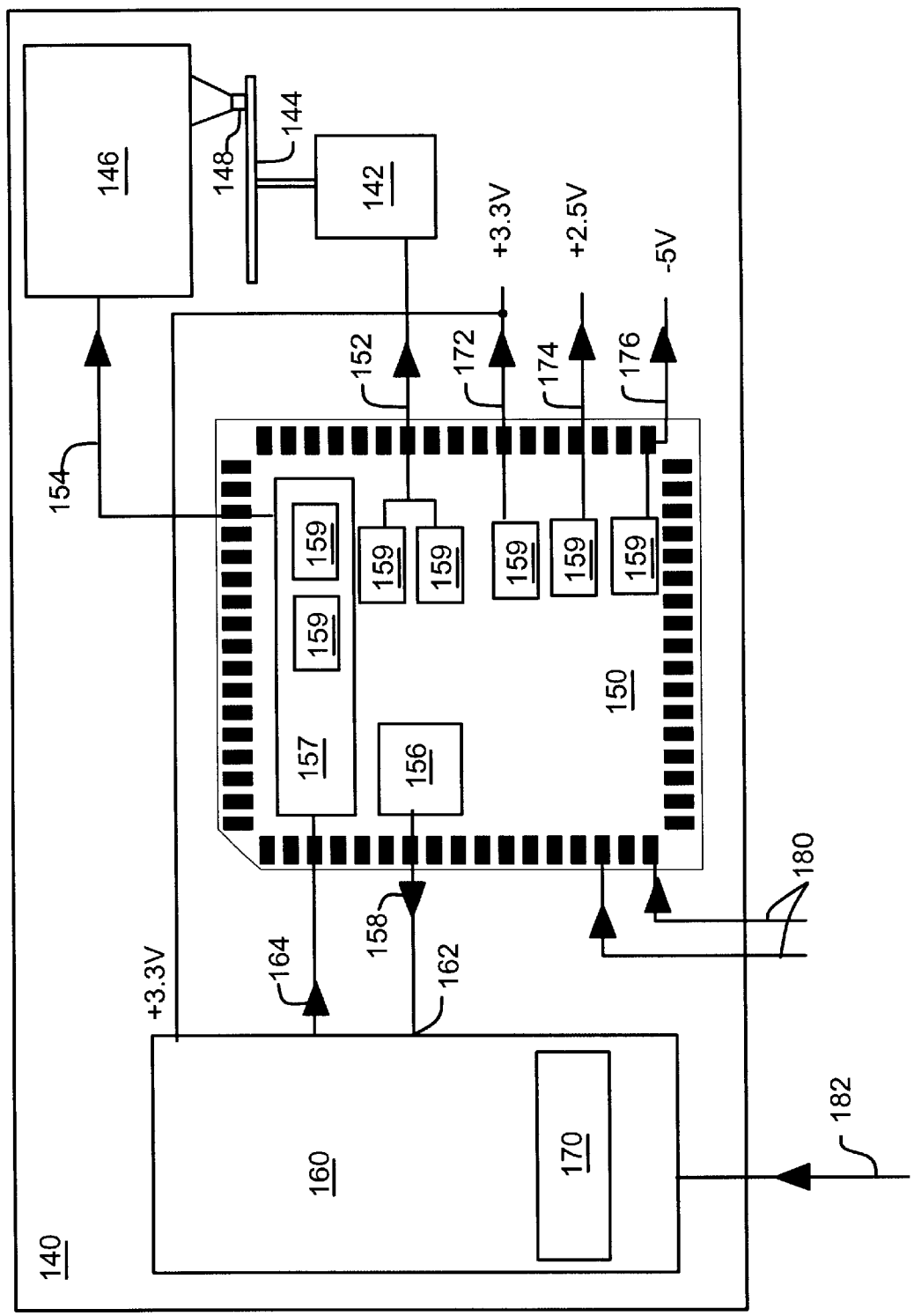
FIG. 2 illustrates a block diagram of a disc drive data storage device.

FIG. 2 illustrates a block diagram of a disc drive 140. Disc drive 140 includes a drive motor 142 mechanically coupled to a disc 144. Disc drive 140 also includes a voice coil motor 146 mechanically coupled to a read/write head 148 on the disc 144. The disc drive 140 includes a power integrated circuit 150 that electrically couples to the drive motor 142 along a line 152. Power integrated circuit 150 includes a voice coil motor driver circuit 157 that electrically couples to the voice coil motor 146 along a line 154. The power integrated circuit 150 includes multiple power semiconductor devices such as devices 159 that dissipate heat in driving the voice coil motor 146 and the drive motor 142. Devices 159 are typically power transistor and can be junction transistors, field effect transistors or other types of current controllers, depending on the needs of the application.

The power integrated circuit 150 also includes at least one integrated temperature sensor 156 providing a temperature output 158 representing a temperature of the power integrated circuit 150. Multiple integrated temperature sensors 156 are preferably included. With multiple integrated temperature sensors, multiple locations on the power integrated circuit die can be sampled to obtain better temperature data. Temperature sensor 156 is preferably integrated into a semiconductor die along with the multiple power semiconductor devices 159. With the temperature sensor 156 integrated into the same semiconductor die as the power semiconductor devices 159, there is close thermal coupling and rapid response time for the temperature sensor 156. This arrangement on the same die allows a temperature control arrangement to operate much closer to the safe reliable operating temperature of the power integrated circuit 150. The temperature sensor 156 has a temperature that is very close to the junction temperatures of the power semiconductor devices 159. Temperature sensor 156 is preferably a semiconductor junction device such as a diode or transistor junction that has a junction voltage that varies as a continuous or analog function of temperature.

Disc drive 140 also includes a control circuit 160 that has an input 162 that receives the temperature output 158. Control circuit 160 provides a voice coil motor control output on serial bus 164 that couples to the voice coil motor driver circuitry 157 in power integrated circuit 150. Control circuit 160 controls the voice coil motor control output on serial bus 164 as a function of the temperature output 158 and as a function of a command signal 182. Command signal 182 is received from a host system (not illustrated) and provides an indication of specific data that the host system (typically a personal computer) is ready to read or write to the disc 144. The control circuit 160 controls the voice coil motor 146 to either perform a seek or a track follow operation to access the desired location on the disc 144. The access speed of the seek operation is preferably adjusted based on the temperature output 158.

Control circuit 160 preferably controls the voice coil motor control output on serial bus 164 according to an algorithm 170 stored in the control circuit. Control circuit 160 controls the voice coil motor control output on serial bus 164 in such a way that control circuit 160 acts both as a servo controller for the position of head 148 and also as a temperature controller for power integrated circuit 150. The operation of control circuit 160 is illustrated in more detail below in an exemplary flow chart shown in FIG. 4 and exemplary voice coil motor waveforms illustrated in FIGS. 5–7.

The temperature output 158 preferably comprises a representation of the temperature that is continuous in a range around a maximum reliably operating temperature of the power integrated circuit 150.

The power integrated circuit 150 preferably generates regulated voltages 172, 174, 176 that couple to the control circuit 160 and other disc drive circuitry (not illustrated) to provide energization. Supply conductors 180 supply current to the power integrated circuit 150 from the host system.

Figure 3:
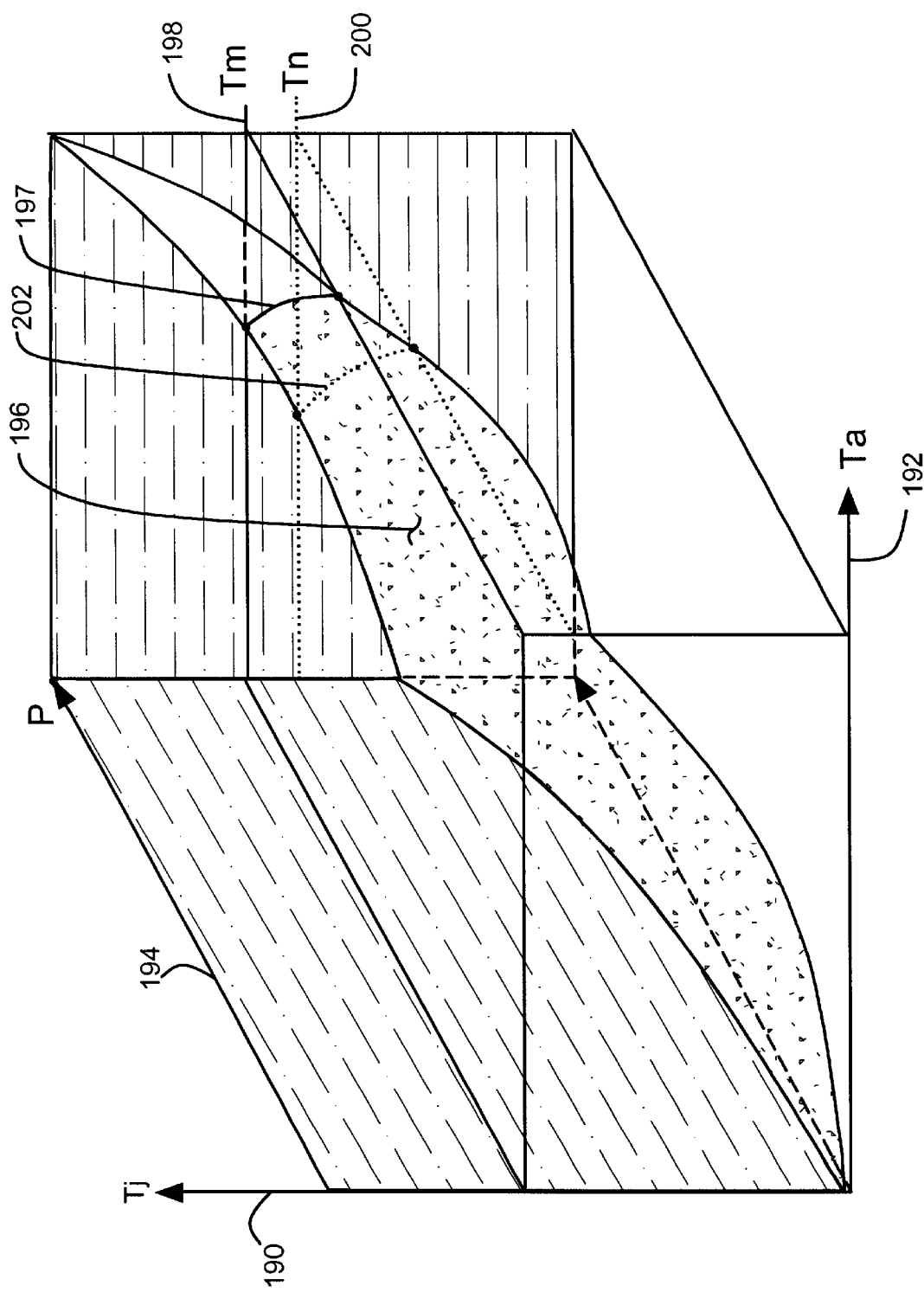
FIG. 3 illustrates an isometric view of a graph of a temperture Tj of a power integrated circuit as a function of ambient temperature Ta and power P.

FIG. 3 illustrates an isometric view of a graph of a temperature Tj of a power integrated circuit such as power integrated circuit 150 as a function of ambient temperature Ta and power P. A vertical axis 190 represents the temperature Tj. A horizontal axis 192 represent an ambient temperature in which the power integrated circuit is operating. An axis 194 represent the amount of power P dissipated by the power integrated circuit. A complex surface 196 represents the temperature of the power integrated circuit as a function of both the ambient temperature and the power. The complex surface 196 intersects along line 197 with a plane 198 that represents the maximum reliable operating temperature of the power integrated circuit. The complex surface 196 also intersects along a line 202 with a plane 200 that represents a nominal temperature Tn. When the temperature Tj of the power integrated circuit is below the nominal temperature Tn, then a controller such as controller 160 does not limit access speed of a voice coil motor control output such as the output on serial bus 164 as a function of temperature. When the temperature Tj is between Tn and Tm, then the controller limits access speed as a function of the temperature. This allows the operation of the disc drive to be extended right up to the maximum reliable operating temperature without having to shut off the disc drive. This control strategy is illustrated in more detail by way of the example flow chart shown in FIG. 4.

Figure 4:
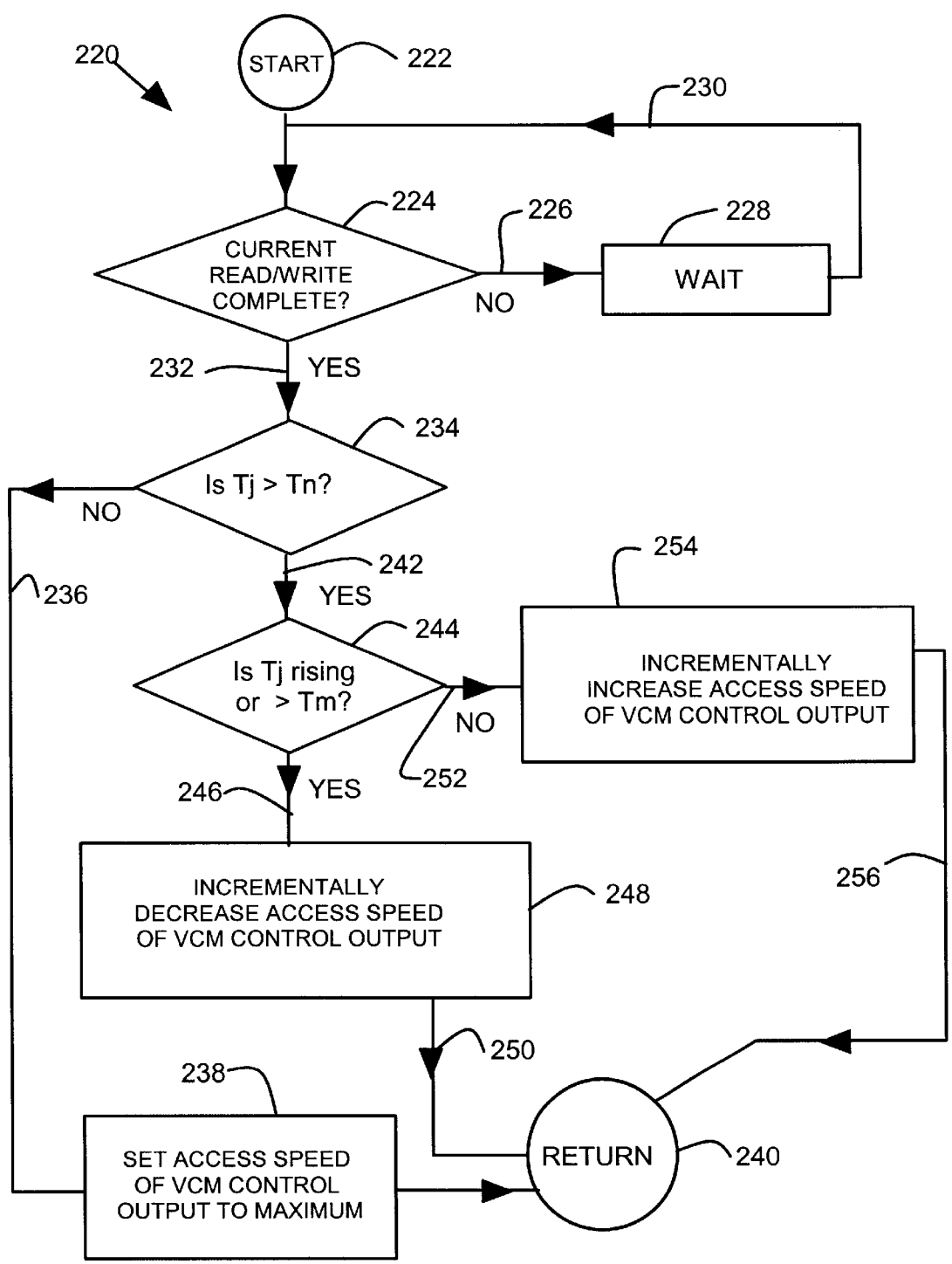
FIG. 4 illustrates a flow chart of an algorithm controlling thermal performance of a power integrated circuit.

FIG. 4 illustrates a flow chart 220 of an algorithm controlling thermal performance of a power integrated circuit. The algorithm 220 starts at a start 222. Program flow continues to a decision point 224 which tests whether the current read/write operation is complete. If the current read/write operation is not complete, then program flow continues along line 226 to a wait operation at 228. After the wait operation at 228, program flow continues along line 230 back to decision point 224. If the current read/write operation is complete, then program flow continues along line 232 to decision point 234.

Decision point 234 tests whether the temperature Tj of the power integrated circuit is above the nominal temperature Tn (see FIG. 3). If the temperature Tj is not above the nominal temperature Tn, then program flow continues along line 236 to function block 238 which sets the access speed of the voice coil control output to it maximum speed. After completion of function block 238, program flow returns at 240 to a main program (not illustrated). If the temperature Tj is above the nominal temperature Tn, then program flow continues from decision point 234 along line 242 to decision point 244.

Decision point 244 tests whether the temperature Tj is rising or if the temperature Tj is above the maximum reliable operating temperature Tm. If the temperature is rising, or if the temperature is above the maximum reliable operating temperature, then program flow continues along line 246 to function block 248. Function block 248 incrementally decreases the access speed of the voice coil motor control output. After completion of function block 248, program flow returns along line 250 to the main program at 240. If the temperature is not rising and if the temperature is not above the maximum reliable operating temperature Tm, then program flow continues along line 252 to function block 254. Function block 254 incrementally increases the access speed of the voice coil control output. After completion of function block 254, program flow continues along line 256 to return to the main program at 240. The details of incrementally increasing or decreasing access speed are explained in more detail in connection with examples illustrated in FIGS. 5–7. It will be understood by those skilled in the art that the sequence of steps illustrated in FIG. 4 is just one example of a sequence of incrementally increasing and decreasing access speed, and that the sequence can be varied according to the needs of the application.

FIG. 5–7 illustrate voice coil motor (VCM) waveforms as a function of time at various access speeds.

FIG. 5 has a vertical axis 270 representing head velocity U(t) and a horizontal time axis 272. Multiple waveforms 274 of a seek operation illustrates how access time is incrementally increased or decreased as a function of the temperature Tj to control power dissipation P.

Velocity waveform 275 is triangle shaped, has a short access time T1 and corresponds to the voice coil current waveform 294 illustrated in FIG. 6. Velocity waveform 275 includes an acceleration interval 275A immediately followed by a deceleration interval 275B and no coast interval. Of the velocity waveforms 275, 276, 277, 278, 279 illustrated in FIG. 5, Waveform 275 has the fastest access time, the fastest peak velocity U1 and also the highest power dissipation in the power integrated circuit. Waveform 275 is the waveform used below the nominal temperature Tn.

Velocity waveforms 276, 277, 278, 279 illustrate incrementally decreasing power consumption, and incrementally increasing access times T2, T3, T4, T5. Velocity waveforms 276, 277, 278, 279 illustrate incrementally decreasing maximum velocities U2, U3, U4, U5, and incrementally increasing coast times C2, C3, C4, C5.

As illustrated in FIG. 6, when the temperature Tj is below a nominal temperature Tn, the seek operation includes an accelerate current pulse 296 causing motion of the voice coil motor in the desired direction of motion and a current pulse 298 in a braking direction.

As illustrated in FIG. 7, when the temperature is above the nominal temperature Tn, an accelerate current pulse 306 is separated from a braking current pulse 310 by a coast interval 307. FIG. 7 has a vertical current axis 300 and a horizontal time axis 302. The amplitude of the accelerate current pulse 306, the amplitude of the braking current pulse 310 and the time length of the coast interval 307 can be incrementally varied or adjusted to reduce access speed and reduce power consumption in the power integrate circuit as a function of temperature. The current pulse 310 can include a long tail 312 of non-saturated operation. The long tail 280 dissipates a great deal of power in a driver such as driver 157 in FIG. 2, but also provides smooth settling to the desired track. When the temperature Tj is above the nominal temperature, then it is desired to limit power dissipation by increasing access time, and the long tail of non saturated operation can be curtailed incrementally.

A continuous analog output of the junction temperature of a power integrated circuit is preferably provided. During a standard read of device parameters, the junction temperature can be automatically read and stored into the servo operational parameters in a control circuit 160. The control circuit (servo) evaluates the junction temperature and determines the maximum allowable device dissipation given current conditions and generates the appropriate time optimal seek profile for the voice coil motor control output as illustrated in FIGS. 5–7. Alternatively, the analog temperature may be digitized and saved in status register(s) in the power integrated circuit.

Advantages of the embodiments illustrated above include: (1) The servo is incrementally optimized and is not slowed down due to the need for excessive margin required to support a lower resolution stepwise system. (2) The higher level systems control, which monitors and scales all disk drive performance, has a continuous input of performance and therefore maintains the highest level of performance in sorting queued commands consistent with dynamically optimized servo performance.

In summary, an embodiment of a disc drive (100, 140) is illustrated that includes a drive motor (127, 142) mechanically coupled to a disc (144, 126). The disc drive also includes a voice coil motor (118, 146) mechanically coupled to a read/write head (110, 148) on the disc.

The disc drive includes a power integrated circuit (150) electrically coupled to the drive motor and the voice coil motor. The power integrated circuit including multiple power semiconductor devices (159) and an integrated temperature sensor (156) providing a temperature output (158) representing a temperature of the power integrated circuit.

The disc drive also includes a control circuit 160 that receives the temperature output (158) and providing a voice coil motor control output (on serial bus 164) to the power integrated circuit as a function of the temperature output.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive while maintaining substantially the same functionality without departing from the scope and spirit of the present invention. In addition, although the preferred embodiment described herein is directed to a power integrated circuit for a disc drive system, it will be appreciated by those skilled in the art that the teachings of the present invention can be applied to other systems, like power hybrid circuits, without departing from the scope and spirit of the present invention.

What is claimed is:

1. A data storage device, comprising:
   a motor mechanically coupled to a data storage medium;
   a voice coil motor mechanically coupled to a read/write head accessing the data storage medium;
   a power integrated circuit electrically coupled to the motor and the voice coil motor, the power integrated circuit including multiple power semiconductor devices and an integrated temperature sensor providing a temperature output representing a temperature of the power integrated circuit; and
   a control circuit receiving the temperature output and providing a voice coil motor control output to the power integrated circuit as a function of the temperature output.

2. The data storage device of claim 1 wherein the temperature output comprises a continuous representation of the temperature.

3. The data storage device of claim 1 wherein the power integrated circuit comprises a semiconductor device generating an analog temperature signal.

4. The data storage device of claim 1, wherein the voice coil motor control output has an access speed and the control circuit adjusts the access speed based on the temperature output after completion of a current read/write cycle.

5. The data storage device of claim 1 wherein the power integrated circuit further generates a regulated voltage that couples to the control circuit.

6. The data storage device of claim 1, wherein the voice coil motor control output has an access speed and the control circuit performs an access speed adjustment when the temperature is above a selected temperature limit.

7. The data storage device of claim 6 wherein the control circuit incrementally decreases the access speed when the temperature is rising.

8. The data storage device of claim 6 wherein the control circuit incrementally increases the access speed when the temperature is not rising.

9. The data storage device of claim 6 wherein the access speed adjustment comprises a deceleration drive time adjustment.

10. The data storage device of claim 9 wherein the deceleration drive time adjustment adjusts linear deceleration drive time.

11. The data storage device of claim 9 wherein the deceleration drive time adjustment adjusts saturated deceleration drive time.

12. The data storage device of claim 6 wherein the access speed adjustment comprises an acceleration drive time adjustment.

13. A data storage device, comprising:
    a control circuit providing a voice coil motor output with an access speed to a power integrated circuit coupled to a voice coil motor, the power integrated circuit including multiple power semiconductor devices and an integrated temperature sensor providing a temperature output representing a temperature of the power integrated circuit; and
    means for controlling the access speed as a function of a temperature of the power integrated circuit.

14. A method of controlling a data storage device having a motor mechanically coupled to a data storage medium and a voice coil motor mechanically coupled to a read/write head accessing the data storage medium, the method comprising:
    electrically controlling the motor and the voice coil motor with a power integrated circuit;
    generating a temperature output representing a temperature of the power integrated circuit; and
    electrically controlling a power integrated circuit including multiple power semiconductor devices and an integrated temperature sensor providing a temperature output representing a temperature of the power integrated circuit with a control circuit receiving the temperature output and providing a voice coil motor control output to the power integrated circuit as a function of the temperature output.

15. The method of claim 14 wherein the temperature output comprises a continuous representation of the temperature.

16. The method of claim 14, further comprising:
    generating an analog temperature output with a semiconductor device in the power integrated circuit.

17. The method of claim 14, further comprising:
    adjusting an access speed of the voice coil motor control output based on the temperature output after completion of a current read/write cycle.

18. The method of claim 14, further comprising:
    providing a regulated voltage generated by the power integrated circuit.

19. The method of claim 14, further comprising performing an incremental access speed adjustment when the temperature is above a selected temperature limit.

* * * * *